July 29, 1941.　　　　P. H. BATTEN　　　　2,250,885
HYDRAULIC COUPLING
Filed Jan. 15, 1940
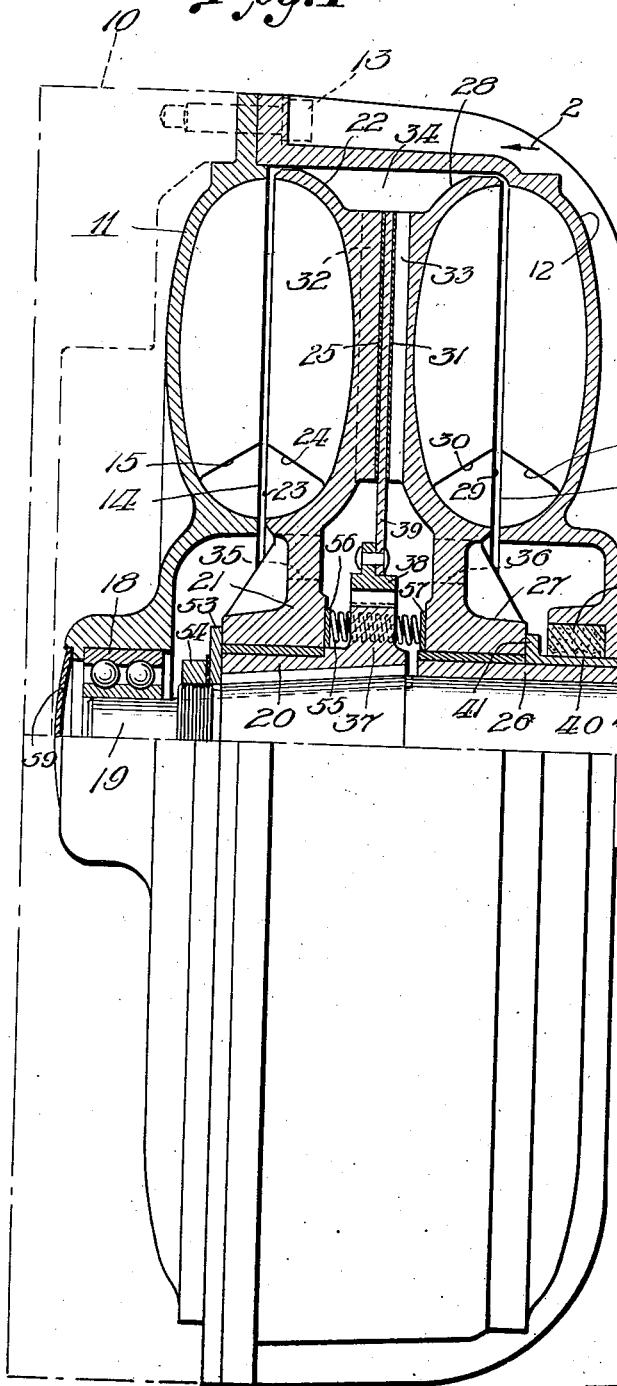
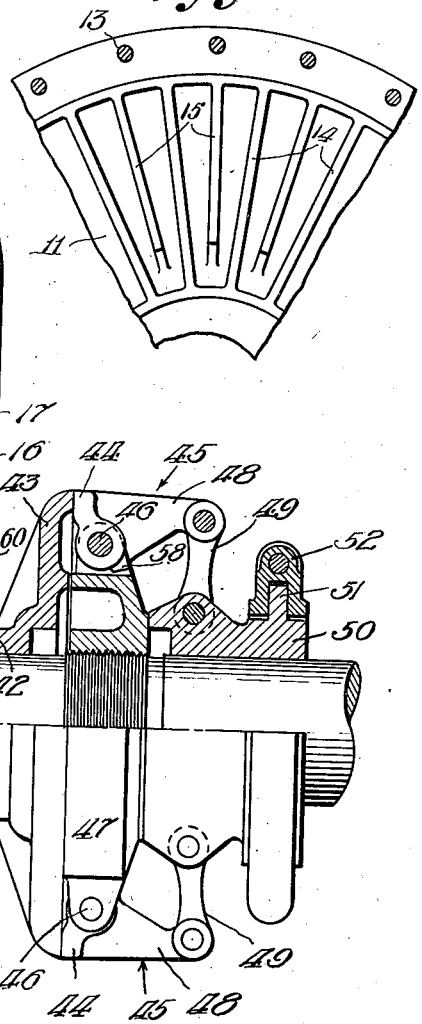
Inventor:
Percy H. Batten
by Davis, Lindsey, Smith & Shonts
Attys.

Patented July 29, 1941

2,250,885

UNITED STATES PATENT OFFICE 2,250,885

HYDRAULIC COUPLING

Percy H. Batten, Racine, Wis., assignor to Twin Disc Clutch Company, Racine, Wis., a corporation of Wisconsin Application January 15, 1940, Serial No. 313,839

16 Claims. (Cl. 192—3.2)

My invention relates to hydraulic couplings and more particularly to a mechanism of this type in which provision is made for preventing the application of any torque to the driven shaft regardless of the speed of the engine or other power source.

One operating difficulty frequently encountered with the ordinary hydraulic coupling is the inability to positively interrupt power flow to the driven shaft as may be required by certain types of the connected machinery. Even at low speeds of the engine and therefore of the coupling impeller, there exists a so-called drag torque which is reflected either in a creeping of the runner shaft or a tendency of this nature in the event that the load resistance exceeds this torque.

It is therefore the principal object of my invention to provide a hydraulic coupling in which the final drive to the driven shaft is effected through devices capable of positive disengagement to definitely interrupt power flow through the coupling.

These and further objects of my invention will be set forth in the following specification, reference being had to the accompanying drawing, and the novel means by which said objects are effectuated will be definitely pointed out in the claims.

In the drawing, Fig. 1 represents an elevation of my improved coupling, partly in section, and showing the coupling conditioned to transmit power.

Fig. 2 is a fragmentary section of the impeller looking in the direction of the arrow 2 in Fig. 1.

Referring to the drawing, the numeral 10 designates a driving member generally which may take the form of a flywheel as shown, or may be simply a shaft or any other type of rotary element. Impellers 11 and 12 are secured to the flywheel in facing and axially spaced relation by cap screws 13. The impeller 11 comprises a plurality of vanes 14 which are disposed in alternating relation to similar but shorter vanes 15 around the impeller to thereby form a plurality of radial fluid passages. Similar vanes 16 and 17 project from the impeller 12 to form like fluid passages.

The central portion of the impeller 11 is axially bored to receive a ball bearing 18 and journaled in this bearing is one end of a driven shaft 19 that extends through and in coaxial relation with the impeller 12. Adjacent the bearing 18, a hub 20 is secured to the shaft 19 and freely journaled on this hub is a disc 21 whose outer annular portion is formed as a runner 22 that is located in facing and cooperating relation to the impeller 11. The runner 22 comprises alternating vanes 23 and 24 which form a plurality of fluid passages and these passages coact with the passages in the impeller 11 to form the usual turbine transmission circuit. An annular friction face 25 is formed on the external surface of the runner 22 for a purpose presently explained. Preferably the mean radius of the face 25 from the shaft 19 is approximately equal to the mean radius from the same shaft of the fluid circuit defined by the impeller 11 and runner 22. This arrangement in conjunction with forming the friction face as an integral part of the runner provides a reduction in the outside diameter and axial length of the unit compared to similar devices wherein the clutch elements are located outwardly or inwardly of the liquid working circuit or are formed entirely separately therefrom.

A sleeve 26 is slidably mounted on the shaft 19 in axially spaced relation to the hub 20 and freely journaled on this sleeve is a disc 27 whose outer annular portion is shaped to provide a runner 28 that is located in facing relation to the impeller 12. This runner comprises alternating vanes 29 and 30 which form the usual fluid passages that coact with the similar passages in the impeller 12 to form a liquid working or turbine transmission circuit. In effect the runners 22 and 28 constitute the inner shells of their respective fluid circuits, while the outer shells are formed by the impellers 11 and 12. The runner 28 is also provided externally with an annular friction face 31 similar to and located in opposed relation to the face 25.

Radial passages 32 and 33 are provided in the runners 22 and 28, respectively, and these passages connect the peripheral space 34 around the coupling with the reservoir space around the shaft 19. The purpose of these passages is to secure an adequate deaeration of the coupling during its early stages of operation, the liquid driving the air from the space 34 and through the passages 32 and 33 into the space around the shaft where the air is liberated and remains during operation of the coupling. Communication between all portions of the reservoir space around the shaft is insured by means of a plurality of openings 35 and 36 which are provided in the discs 21 and 27, respectively.

Since the runners 22 and 28 are freely journaled relative to the driven shaft 19, it is necessary to provide a releasable mechanical connection between the runners and the shaft such that the power connection through the coupling to the shaft can be easily made or broken and, when interrupted, torque will not be exerted on the shaft.

To this end, the hub 20 incorporates an annular flange 37 whose periphery may be toothed or otherwise formed for driving connection with a similarly formed annular ring 38 to which is attached a clutch plate 39 having the usual friction facings secured to the opposite surfaces thereof. As clearly shown in the drawing, this plate is located between the runner faces 25 and 31, so that when the runner 28 is shifted as presently described, the plate 39 will be gripped between the runner faces to provide a friction clutch connection with the shaft 19.

The devices for shifting the runner 28 into the driving position shown comprise a thrust-sleeve 40 which encircles the sleeve 26 and is provided at its inner end with an annular flange 41 that abuts the runner disc 27, while the opposite end abuts a shoulder 42 provided on the sleeve 26.

The sleeve 26 projects externally of the coupling and is formed with an annular flange 43 that is engaged by the free end of an arm 44 of a lever 45 that is pivotally mounted as at 46 on an adjusting ring 47 that is threaded on the shaft 19. The other lever arm 48 is pivotally connected to one end of a link 49 whose opposite end is pivotally attached to a sleeve 50 that is reciprocable on the shaft 19. The sleeve 50 is provided with an annular flange 51 which may be engaged by an operating collar 52 that may be actuated in any suitable manner.

In the operation of the coupling, it will be assumed that the runner 28 and plate 39 occupy positions to the right of those illustrated in the drawing so that no power is transmitted to the shaft 19. Under these conditions, the external actuating mechanism will occupy a released position, with the sleeve 50 shifted toward the right and the lever arm 44 not exerting pressure on the sleeve flange 43. When the sleeve 50 is moved toward the left, the lever arm 44 engages the flange 43 and through the thrust sleeve 40 shifts the runner 28 to grip the plate 39 between the runner faces 25 and 31. Under these conditions, the impellers and runners coact to hydraulically transmit power in the usual manner, but the final drive to the shaft 19 is effected through the friction clutch construction.

During the movement of the runner 28 to a power transmitting position, axial movement of the runner 22 toward the left is prevented by engagement with an abutment ring 53 that encircles the shaft 19 and is held in position by a nut 54, while the movement of the runner 28 toward the left is effected against the compression of a plurality of helical springs 55 that are carried in suitable apertures provided in the hub flange 37 and may occupy positions generally parallel to the axis of the shaft 19. One end of each spring abuts a shoe ring 56 that bears against the disc 21 while the opposite end abuts a shoe ring 57 that bears against the runner disc 27.

When it is desired to release the coupling, the sleeve 50 is moved toward the right until the nose 58 engages the outer surface of the adjusting ring 46 and, during this action, the extending action of the springs 55 shifts the runner 28 toward the right to thereby permit the plate 39 to assume a free position between the runner surfaces 25 and 31. The stop provided by the nose 58 also limits the axial movement of the runner 28 in a releasing direction. Accordingly, during periods of release, any drag torque that may be exerted on the runners 22 and 28 will merely cause the free rotation of the runners around the shaft 19 so that this shaft will not tend to creep, but will remain entirely stationary during the period of release.

My improved construction therefore provides a relatively simple coupling arrangement that enables full power transmission to the shaft 19 within the usual limits encountered in hydraulic couplings, or the absolute interruption of this power flow as desired. Seal of the coupling reservoir may be effected by packings 59 and 60 located at the axial ends of the coupling.

I claim:

1. A hydraulic coupling comprising in combination, a pair of axially spaced and connected impellers located in facing relation, a shaft coaxial with the impellers, a pair of runners freely journaled relative to the shaft and forming with the impellers a pair of liquid working chambers, one of the runners being movable axially of the shaft, axially shiftable clutch means secured to the shaft between and adapted to engage both runners, and means for shifting the movable runner to engage the clutch means with both runners.

2. A hydraulic coupling comprising in combination, a pair of axially spaced and connected impellers located in facing relation, a shaft coaxial with the impellers, a pair of runners freely journaled relative to the shaft and forming with the impellers a pair of liquid working chambers, each of the runners having an annular friction face and one of the runners being movable axially of the shaft, an axially shiftable clutch plate secured to the shaft between the runner faces, and means for shifting the movable runner to grip the plate against the other runner.

3. A hydraulic coupling comprising in combination, a pair of axially spaced and connected impellers located in facing relation, a shaft coaxial with the impellers, a pair of runners freely journaled relative to the shaft and forming with the impellers a pair of liquid working chambers, each of the runners having an annular friction face and one of the runners being movable axially of the shaft, an axially shiftable clutch plate having a toothed driving connection with the shaft and located between the runner faces, and means for shifting the movable runner to grip the plate against the other runner.

4. A hydraulic coupling comprising in combination, a pair of axially spaced and connected impellers located in facing relation, a shaft coaxial with the impellers, a hub secured to the shaft, first and second runners freely journaled relative to the shaft, the second runner being movable axially relative thereto, the runners forming with the impellers, respectively, a pair of liquid working chambers, axially shiftable clutch means secured to the shaft between and adapted to engage both runners, means for shifting the movable runner to engage the clutch means with both runners, and springs carried by the hub and abutting the runners for returning the movable runner to release position.

5. A hydraulic coupling comprising in combination, a pair of axially spaced and connected impellers located in facing relation, a shaft coaxial with the impellers, a hub fixed on the shaft, a sleeve having a shoulder axially shiftable on the shaft and spaced from the hub, first and second runners freely journaled relative to the shaft, the second runner being movable axially relative thereto, each runner having an annular friction face and the runners forming with the impellers, respectively, a pair of liquid working chambers, an axially shiftable clutch plate secured to the hub between the runner faces, and means for moving the sleeve to cause the shoulder to bear against and shift the movable runner to grip the plate between the runner faces.

6. A hydraulic coupling comprising in combination, a pair of axially spaced and connected impellers located in facing relation, a shaft coaxial with the impellers, a hub fixed on the shaft, a sleeve having a shoulder axially shiftable on the shaft and spaced from the hub, first and second runners freely journaled relative to the shaft, the second runner being movable axially relative thereto, each runner having an annular friction face and the runners forming with the impellers, respectively, a pair of liquid working chambers, an axially shiftable clutch plate secured to the hub between the runner faces, means for moving the sleeve to cause the shoulder to bear against and shift the movable runner to grip the plate between the runner faces, and springs carried by the hub and abutting the runners for returning the movable runner to release position.

7. A hydraulic coupling comprising in combination, a pair of axially spaced and connected impellers located in facing relation, a shaft coaxial with the impellers, a hub fixed on the shaft, an axially shiftable sleeve on the shaft having a shoulder disposed internally of the coupling and an annular flange externally of the coupling, first and second runners freely journaled relative to the shaft, the second runner being movable axially relative thereto, each runner having an annular friction face and the runners forming with the impellers, respectively, a pair of liquid working chambers, an axially shiftable clutch plate secured to the hub between the runner faces, and lever mechanism having a part adapted to press against the flange to thereby cause the shoulder to bear against and shift the movable runner to grip the plate between the runner faces.

8. A hydraulic coupling comprising in combination, a pair of axially spaced and connected impellers located in facing relation, a shaft coaxial with the impellers, a pair of runners freely journaled relative to the shaft and forming with the impellers a pair of liquid working chambers, one of the runners being movable axially of the shaft, axially shiftable clutch means escured to the shaft between and adapted to engage both runners, and means for shifting the movable runner to engage the clutch means with both runners, each runner having a deaerating passage located adjacent the clutch engaging portions thereof and connecting the peripheral space between the chambers and the space around the shaft and through which air is driven to the last-named space during the early stages of operation.

9. A hydraulic coupling comprising in combination, a pair of axially spaced and connected impellers located in facing relation, a shaft coaxial with the impellers, a pair of runners freely journaled relative to the shaft and forming with the impellers a pair of liquid working chambers, and clutch means secured to the shaft and engageable with the runners to establish a driving connection with the shaft.

10. A hydraulic coupling comprising a casing enclosing a pair of axially aligned, fluid turbine transmission circuits, each composed of an inner and outer shell, a shaft coaxial with the casing, the inner pair of shells being freely journaled relative to the shaft, and clutch means secured to the shaft and engageable with the inner shells to establish a driving connection between the shaft and outer shells.

11. A hydraulic coupling comprising a casing enclosing a pair of axially aligned, fluid turbine transmission circuits, each composed of an inner and outer shell, a shaft coaxial with the casing, the inner pair of shells being freely journaled relative to the shaft, and axially shiftable clutch means secured to the shaft between and engageable with the inner shells to establish a driving connection with the shaft.

12. A hydraulic coupling comprising a casing enclosing a pair of axially aligned, fluid turbine transmission circuits, each composed of an inner and outer shell, a shaft coaxial with the casing, the inner pair of shells being freely journaled relative to the shaft and relatively movable in axial directions, and clutch means secured to the shaft between and adapted to be gripped by the inner shells to provide a driving connection with the shaft.

13. A hydraulic coupling comprising in combination an impeller, a shaft coaxial with the impeller, a member freely and coaxially journaled relative to the shaft, one side of the member being shaped and arranged for runner cooperation with the impeller to form a fluid turbine transmission circuit and the opposite side being arranged as a friction face whose mean radius from the shaft is approximately equal to the mean radius of the circuit from the shaft, and a clutch plate drivably secured to the shaft and engageable with the friction face to provide a driving connection between the member and shaft.

14. A hydraulic coupling comprising in combination an impeller, a shaft coaxial with the impeller, a runner freely and coaxially journaled relative to the shaft and cooperably related to the impeller to form a fluid turbine transmission circuit, the runner having integrally formed therewith a friction face whose mean radius from the shaft is approximately equal to the mean radius of the circuit from the shaft, and a clutch plate drivably secured to the shaft and engageable with the friction face to provide a driving connection between the member and shaft.

15. A hydraulic coupling comprising in combination an impeller, a shaft coaxial with the impeller, a runner freely and coaxially journaled relative to the shaft and cooperably related to the impeller to form a fluid turbine transmission circuit, and clutch means secured to the shaft and having a part directly engageable with the runner to establish a driving connection with the shaft, the mean radius of the circuit from the shaft being approximately equal to the mean radius of the engaging portion of the part from the shaft.

16. A hydraulic coupling comprising a casing enclosing a pair of shells cooperatively related to provide a fluid turbine transmission circuit, a shaft coaxial with the casing, one of the shells being freely journaled relative to the shaft, and clutch means secured to the shaft and having a part directly engageable with the freely-journaled shell to establish a driving connection between the shaft and the other shell, the mean radius of the circuit from the shaft being approximately equal to the mean radius of the engaging portion of the part from the shaft.

PERCY H. BATTEN.